(12) United States Patent
Yeh et al.

(10) Patent No.: US 9,781,806 B1
(45) Date of Patent: Oct. 3, 2017

(54) LIGHT-EMITTING DIODE DRIVING DEVICE AND SHORT PROTECTION METHOD FOR DRIVING DEVICE

(71) Applicant: Wistron Corporation, New Taipei (TW)

(72) Inventors: Shih-Chi Yeh, New Taipei (TW); Ju-Hsing Hu, New Taipei (TW); Pei-Chi Tsai, New Taipei (TW); Wei-Chiuan Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/361,009

(22) Filed: Nov. 24, 2016

(30) Foreign Application Priority Data

Aug. 17, 2016 (TW) .............................. 105126183 A

(51) Int. Cl.
*H05B 37/02* (2006.01)
*H05B 33/08* (2006.01)

(52) U.S. Cl.
CPC ..... *H05B 33/0887* (2013.01); *H05B 33/0827* (2013.01)

(58) Field of Classification Search
CPC .. H05B 33/0815; H05B 33/089; H05B 37/03; H05B 33/0887; H05B 33/0827
USPC ................................................ 315/291, 122
See application file for complete search history.

(56) References Cited

U.S. PATENT DOCUMENTS

| | | | | |
|---|---|---|---|---|
| 5,636,288 | A * | 6/1997 | Bonneville | H02J 9/005 363/79 |
| 6,225,912 | B1 * | 5/2001 | Tanaka | B41J 2/45 340/641 |
| 8,692,477 | B1 * | 4/2014 | Lee | H05B 33/0815 315/185 S |
| 2010/0181941 | A1 * | 7/2010 | Kuo | H05B 33/089 315/320 |
| 2012/0049761 | A1 * | 3/2012 | Yu | G09G 3/3406 315/294 |
| 2012/0068714 | A1 * | 3/2012 | Wang | G01R 31/025 324/414 |
| 2012/0293082 | A1 * | 11/2012 | Huang | H05B 33/089 315/192 |

(Continued)

FOREIGN PATENT DOCUMENTS

TW    I375487    10/2012

*Primary Examiner* — Don Le
(74) *Attorney, Agent, or Firm* — Jianq Chyun IP Office

(57) ABSTRACT

A light-emitting diode (LED) driving device and a short protection method for a driving device are provided. The driving device includes an LED module, a driving circuit, a reference voltage setting circuit, a voltage comparison circuit, and a power supply. A first node of the LED module receives a lighting voltage, and a second node of the LED module has a first voltage. The reference voltage setting circuit receives the lighting voltage to generate a reference voltage. The voltage comparison circuit determines whether the first voltage is greater than the reference voltage when the LED module is turned off. When the first voltage is greater than the reference voltage, the voltage comparison circuit generates a short signal. The power supply supplies power to the LED module and determines whether to shut down the power of the LED driving device according to the short signal.

8 Claims, 3 Drawing Sheets

(56) References Cited

U.S. PATENT DOCUMENTS

| | | | | |
|---|---|---|---|---|
| 2014/0333204 A1* | 11/2014 | Zhang | ............. | G09G 3/00 |
| | | | | 315/119 |
| 2016/0087535 A1* | 3/2016 | Hsiao | ............. | H02M 3/338 |
| | | | | 307/31 |
| 2017/0034887 A1* | 2/2017 | Ichikawa | ............. | B60Q 1/04 |

* cited by examiner

LIGHT-EMITTING DIODE DRIVING DEVICE AND SHORT PROTECTION METHOD FOR DRIVING DEVICE

CROSS-REFERENCE TO RELATED APPLICATION

This application claims the priority benefit of Taiwan application serial no. 105126183, filed on Aug. 17, 2016. The entirety of the above-mentioned patent application is hereby incorporated by reference herein and made a part of this specification.

FIELD OF THE INVENTION

The invention relates to a driving technology of a light-emitting diode (LED); more particularly, the invention relates to an LED driving device and a short protection method of a driving device.

DESCRIPTION OF RELATED ART

With the progress in semiconductor technology, brightness of an LED and a light-emitting efficiency thereof continuously increase. The LED has advantages of long service life, small volume, low consumption of electricity, low degree of pollution, great reliability, adaptation of mass production, and so on. The LED can be extensively applied in various fields, such as in illumination apparatuses, liquid crystal displays (LCD), backlight sources of large billboards, etc.

Generally, to prevent the collateral damages to crucial parts (e.g., transistors) in a driving device when the LED is damaged, precautionary measures are often established to comply with the issue of short LED. In another aspect, the driving device of the LED often drives the LED through scanning backlight, over driving, or local dimming according to pulse width modulation (PWM) signals. Said driving device often changes the cycle of electric current flowing through the LED and the amplitude of the electric current, such that the bias of the LED in an on stage becomes unstable. Thereby, if the LED is turned on, a short detection circuit in the driving device may malfunction. As such, manufacturers intend to direct the research and development activities to effectuate short protection mechanism of the LED.

SUMMARY OF THE INVENTION

The invention provides an LED driving device and a short detection method of an LED, so as to effectively prevent the driving device from being damaged by an LED encountering a short issue.

In an embodiment of the invention, a driving device including an LED module, a driving circuit, a reference voltage setting circuit, a voltage comparison circuit, and a power supply is provided. A first node of the LED module receives a lighting voltage, and a second node of the LED module has a first voltage. The driving circuit is configured to drive the LED module. The reference voltage setting circuit receives the lighting voltage to generate a reference voltage. The voltage comparison circuit determines whether the first voltage is greater than the reference voltage when the LED module is turned off. When the first voltage is greater than the reference voltage, the voltage comparison circuit generates a short signal. The power supply is configured to supply power to the LED module and determine whether to shut down the power of the LED driving device according to the short signal.

In an embodiment of the invention, a short protection method of a driving device includes following steps. A first voltage of an LED module is received. Here, a first node of the LED module receives a lighting voltage, and a second node of the LED module has a first voltage. A reference voltage is generated. Here, the reference voltage is relevant to a breakdown voltage of a Zener diode and the lighting voltage. Whether the first voltage is greater than the reference voltage is determined when the LED module is turned off, so as to generate a short signal. Whether to shut down power of the LED driving device is determined according to the short signal.

In view of the above, the LED driving device and the short protection method of the driving device generate the reference voltage through the Zener diode, and the bias and the reference voltage of the LED module are applied to determine whether some of the LEDs in the LED module encounter the issue of short circuit, so as to shut down the power of the driving device. As such, the LED driving device provided herein can effectively prevent the driving device from being damaged by the LED encountering the short issue.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Figure 1:
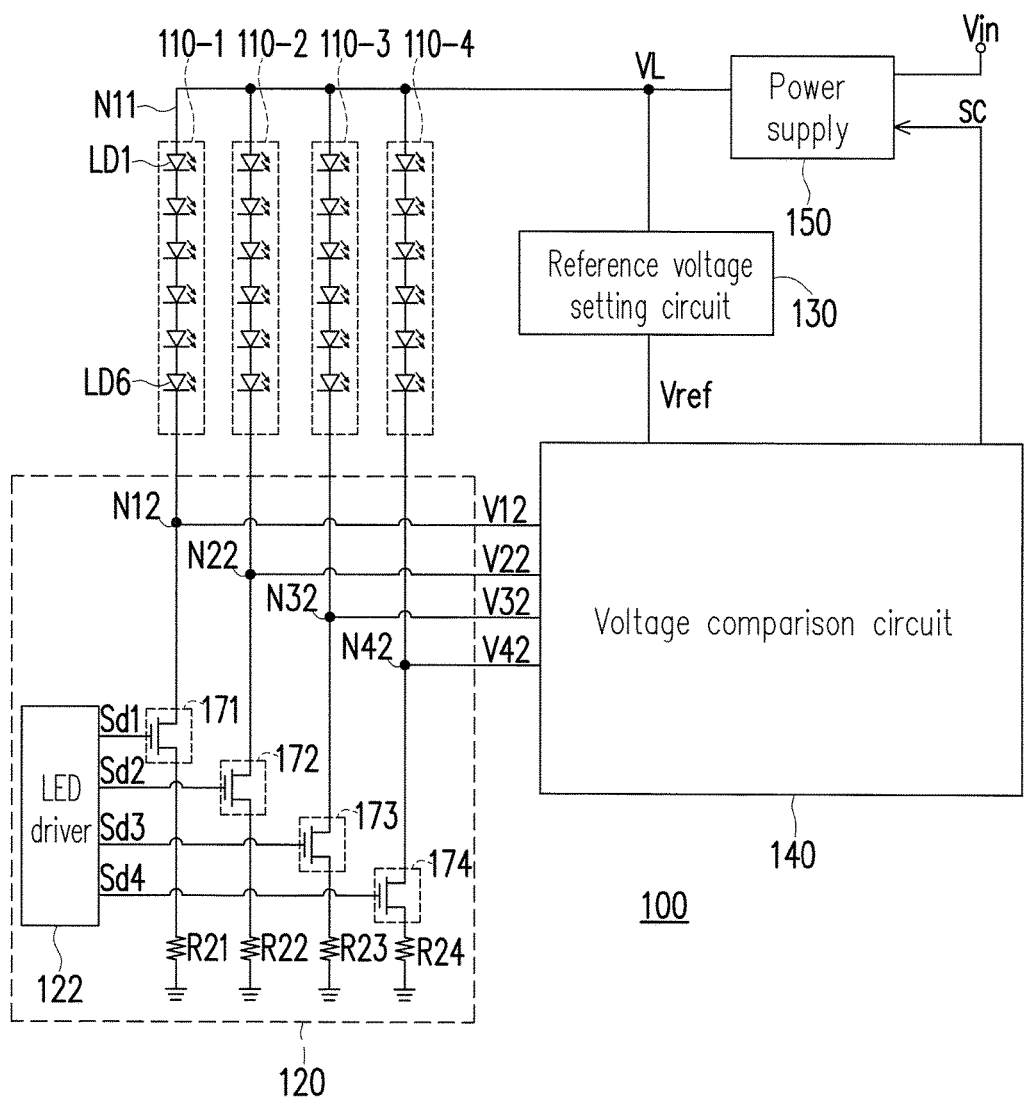
FIG. 1 is a schematic diagram of an LED driving device according to an embodiment of the invention.

FIG. 1 is a schematic diagram of an LED driving device 100 according to an embodiment of the invention. With reference to FIG. 1, the LED driving device (hereinafter referred to as "driving device 100") includes LED modules 110-1-110-4, a driving circuit 120, a reference voltage setting circuit 130, a voltage comparison circuit 140, and a power supply 150. The driving device 100 may include one or more LED modules. In the present embodiment, four LED modules 110-1-110-4 are exemplified to explain the invention. People may adjust the required number of LED modules (e.g., eight or more LED modules) in view of the present embodiment according to actual needs.

Each of the LED modules 110-1-110-4 includes a plurality of serially connected LEDs. That is, each of the LED modules 110-1-110-4 includes a LED light string (i.e., a LED light bar) constituted by serially connected LEDs. In the LED modules 110-1-110-4 described in the present embodiment, each LED light string is comprised of six serially connected LEDs, and people may adjust the number of LEDs in each LED light string in view of the present embodiment according to actual needs. In the exemplary LED module 110-1, an anode terminal of the first LED LD1 in the LED modules 110-1-110-4 serves as the first node N11 of the LED modules 110-1-110-4, so as to receive the lighting voltage VL supplied by the power supply 150. A cathode terminal of the last LED LD6 in the LED module 110-1 serves as the second node N12 that is coupled to the driving circuit 120. In the present embodiment of the invention, the second nodes N12-N42 of the LED modules 110-1-110-4 respectively include corresponding first voltages V12-V42.

The driving circuit 120 is configured to drive the LED modules 110-1-110-4. Specifically, the driving circuit 120 includes an LED driver 122 and current balancing switches 171-174 corresponding to the LED modules 110-1-110-4. The LED driver 122 can generate driving signals Sd1-Sd4 for controlling the current balancing switches 171-174. In other words, the LED driver 122 drives the LED modules 110-1-110-4 according to the driving signals Sd1-Sd4 by using the current balancing switches 171-174. First terminals of the current balancing switches 171-174 are respectively coupled to the corresponding LED modules 110-1-110-4, second terminals of the current balancing switches 171-174 are respectively coupled to resistors R21-R24, and control terminals of the current balancing switches 171-174 respectively receive the corresponding driving signals Sd1-Sd4. The driving signals Sd1-Sd4 may be PWM signals. The current balancing switches 171-174 may be implemented in form of metal oxide semiconductor field effect transistors (MOSFETs), e.g., n-type MOSFETs. If the first voltages V12-V42 are overly large, the MOSFETs acting as the current balancing switches 171-174 may be damaged accordingly.

The reference voltage setting circuit 130 is configured to receive the lighting voltage VL to generate a reference voltage Vref. The voltage comparison circuit 140 selects the maximum first voltage from the first voltages V12-V12; on the condition that the LED modules 110-1-110-4 are being turned off, the voltage comparison circuit 140 determines whether the maximum first voltage is greater than the reference voltage Vref. If the maximum first voltage is less than the reference voltage Vref, it indicates that no short issue occurs in the LEDs of the LED modules 110-1-110-4. However, if some LEDs are damaged and thus result in the short issue, the first voltages of the LED modules having the damaged LEDs are raised. The LEDs are diodes. Hence, if the voltage difference at two ends of the LEDs are overly large, the LEDs are likely to be broken down, and the two ends may be electrically conducted, such that the short issue occurs. Hence, if the maximum first voltage selected from the first voltages V12-V42 is greater than the reference voltage Vref, the voltage comparison circuit 140 generates a short signal SC. The power supply 150 receives an input voltage Vin to supply power (or supply the lighting voltage VL) to the LED modules 1101-110-4; similarly, the power supply 150 also supplies power to the entire LED driving device 100. According to whether the short signal SC is being enabled or not, the power supply 150 determines whether to shut down the power of the LED driving device 100. That is, when the short signal SC is being enabled, the power supply 150 shuts down the power of the LED driving device 100.

The reasons of the increase in the first voltage when some of the LEDs in the LED modules encounter the short issue are described hereinafter. If the LED modules 110-1-110-4 already receive the lighting voltage VL but are turned off due to the control of the LED driver 122 (e.g., the control of the driving signal to stop the electric current from flowing through the LED modules 110-1-110-4, where the electric current is generated by the lighting voltage VL), and if each LED in the LED module 110-1 remains intact, the first voltage V12 is obtained by subtracting six LED biases from the lighting voltage VL. By contrast, if the LED LD1 in the LED module 110-1 is damaged and thus becomes short, the first voltage V12 is obtained by subtracting five LED biases from the lighting voltage VL. That is, as long as any LED in the LED modules is damaged and thus becomes short, the first voltage V12 is increased by one LED bias in comparison with the original first voltage V12. When the LED modules 110-1-110-4 are being turned on, the electric current flowing through the LEDs does not remain constant, and thus the bias of each LED may float. Thereby, the step of "comparing the maximum voltage of the first voltages V12-V42 with the reference voltage Vref to determine whether the LED encounters the short issue" may not be substantially feasible. Hence, according to the present embodiment, the voltage comparison circuit 140 performs the voltage comparison action on the condition that the LED modules are electrically conducted and are being turned off.

Figure 2:
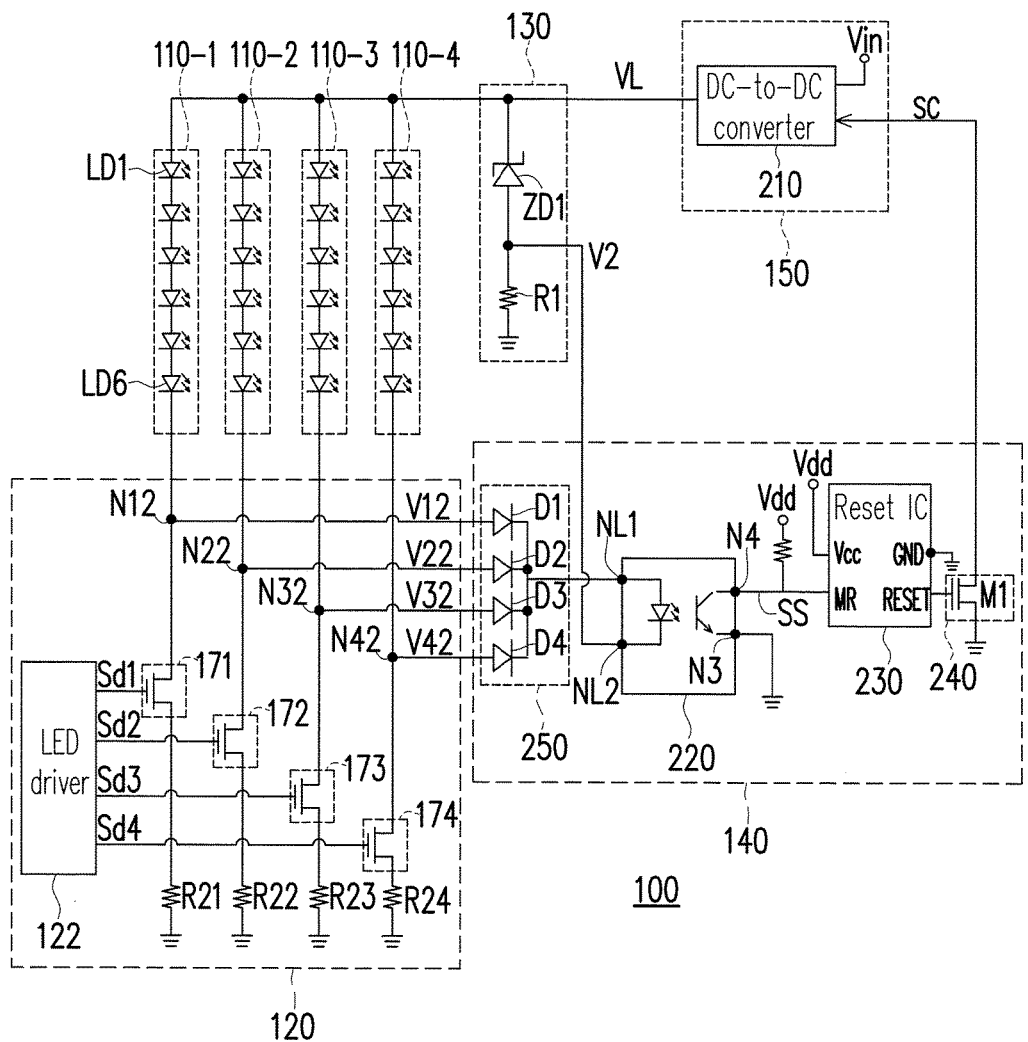
FIG. 2 is a detailed circuit diagram of an LED driving device according to an embodiment of the invention.

FIG. 2 is a detailed circuit diagram of the LED driving device 100 according to an embodiment of the invention. In FIG. 2, the power supply 150 is implemented in form of a direct-current-to-direct-current (DC-to-DC) converter 210 which receives the input voltage Vin to generate the lighting voltage VL and determines whether to shut down the power of the LED driving device 100 according to whether the short signal SC is being enabled or not.

The reference voltage setting circuit 130 includes a Zener diode ZD1 and a first resistor R1. The Zener diode ZD1 has a breakdown voltage. A cathode terminal of the Zener diode ZD1 receives the lighting voltage VL. The first resistor R1 is coupled between an anode terminal of the Zener diode ZD1 and a ground terminal. Hence, when the Zener diode ZD is in a breakdown state, the reverse bias of the Zener diode ZD becomes a constant breakdown voltage, such that the reference voltage Vref is obtained by subtracting the breakdown voltage in the Zener diode ZD1 from the lighting voltage VL. Therefore, the lighting voltage VL should be greater than the breakdown voltage; as such, when the electric current flowing through the LED modules 110-1-110-4 is zero, the Zener diode ZD1 is in the breakdown state, and thereby the reference voltage setting circuit 130 can operate smoothly.

The voltage comparison circuit 140 includes a photo coupler 220, a reset IC 230, and a power control switch 240. The voltage comparison circuit 140 further includes a propagation circuit 250. The propagation circuit 250 includes first diodes D1-D4 respectively corresponding to the LED modules 110-1-110-4. Anode terminals of the first diodes D1-D4 are coupled to the first nodes N12-N42 of the LED modules 110-1-110-4 to receive the first voltages V12-V42. Cathode terminals of the first diodes D1-D4 are coupled to the first input terminals NL1 of the photo coupler 270. Through the first diodes D1-D4, the voltage at the first input terminal NL1 of the photo coupler 270 is the maximum voltage among the first voltages V12-V42.

The first input terminal NL1 of the photo coupler 220 at the LED side receives the maximum voltage among the first voltages V12-V42 through the propagation circuit 250. The second input terminal NL2 of the photo coupler 220 at the LED side is coupled to the reference voltage setting circuit 130 to receive the reference voltage Vref. The third terminal N3 of the photo coupler 220 is coupled to the ground terminal, and the fourth terminal N4 (i.e., the output terminal) of the photo coupler 220 generates the comparison signal SS. Thereby, the photo coupler 220 may serve as the comparator and the isolator of the reference voltage Vref and the maximum voltage among the first voltages V12-V42.

If each LED in the LED module 110-1 remains intact, the first voltage V12 is obtained by subtracting six LED biases from the lighting voltage VL. Given that the bias of each intact LED is 2.5V, the bias of the first diode D1 is 0.6V, the breakdown voltage of the Zener diode ZD1 is set as 16V, and the bias of the LED in the photo coupler 220 is set as 1.2V. Thereby, the voltage at the first input terminal NL1 of the photo coupler 220 at the LED side is obtained by "subtracting six LED biases (6*2.5V=15V) and the bias (0.6V) of the first diode from the lighting voltage VL", and the reference voltage Vref is obtained by "subtracting the breakdown voltage (16V) from the lighting voltage VL". At this time, the difference between the first voltage (VL-6*2.5V-0.6V) at the first input terminal NL1 of the LED in the photo coupler 220 and the reference voltage (VL-16V) at the second input terminal NL2 is not greater than the bias (1.2V) of the LED in the photo coupler 220; therefore, the LED in the photo coupler 220 is not turned on, and the comparison signal SS remains disabled. By contrast, if the first LED LD1 in the LED module 110-1 is damaged and thus encounters the short issue, and the other LEDs remain intact, the difference between the first voltage (VL-6*2.5V-0.6V) at the first input terminal NL1 of the LED in the photo coupler 220 and the reference voltage (VL-16V) at the second input terminal NL2 is greater than the bias (1.2V) of the LED in the photo coupler 220; hence, the LED in the photo coupler 220 is turned on, and the comparison signal SS becomes enabled.

The breakdown voltage of the Zener diode ZD1 provided herein may be determined by those who actually implement the present embodiment. If the transistors in the driving device 100 have high tolerance, i.e., if the number of the LEDs encountering the short issue is somehow significant but the transistors can still remain intact, the breakdown voltage in the Zener diode ZD1 can be set to have a small value. If, however, the transistors in the driving device 100 have low tolerance, i.e., if the number of the LEDs encountering the short issue is somehow insignificant but the transistors may still be easily damaged, the breakdown voltage in the Zener diode ZD1 should be set to have a large value. The breakdown voltage may be properly adjusted according to the tolerance of the transistors. It should be mentioned that the breakdown voltage cannot be greater than the sum of the total LED biases of all LEDs (e.g., six LEDs) in the LED light string, the bias of one diode (e.g., the diode D1), and the bias of the LED in the photo coupler 220.

The comparison signal SS is sent to the reset IC 230 through the fourth terminal N4 of the photo coupler 220. Specifically, in some embodiments of the invention, the LED scanning frequency generated through the driving signals Sd1-Sd4 by the LED driver 122 is relatively high (e.g., 480 Hz); thus, the cycle time of the comparison signal SS generated by the photo coupler 222 is thus overly short, and the voltage level of the comparison signal SS becomes inaccurate. The reset IC 230 serves to adjust the voltage level and the cycle time of the comparison signal SS and ensures said cycle time to be greater than 200 msc, such that the transistor M1 can operate smoothly. The VCC terminal of the reset IC 230 is connected to the system voltage Vdd, the GND terminal is coupled to the ground terminal, and the RESET terminal generates the comparison signal SS whose voltage level has been adjusted.

The control terminal of the power control switch 240 receives the comparison signal SS. When the maximum first voltage among the first voltages V12-V42 is greater than the reference voltage Vref, the power control switch enables the short signal SC. Specifically, the power control switch 240 includes a transistor M1 (e.g., a p-type enhanced MOSFET). A gate terminal of the transistor M1 is the control terminal of the power control switch 240. A first terminal of the transistor M1 generates the short signal SC, and a second terminal of the transistor M1 is coupled to the ground terminal. Hence, when the comparison signal SS is being enabled (i.e., logic "0"), the first terminal and the second terminal of the transistor M1 are electrically conducted, so as to enable the short signal SC (i.e., logic "0"). The power supply 150 shuts down the power of the LED driving device 100 when the short signal SC is enabled.

Figure 3:
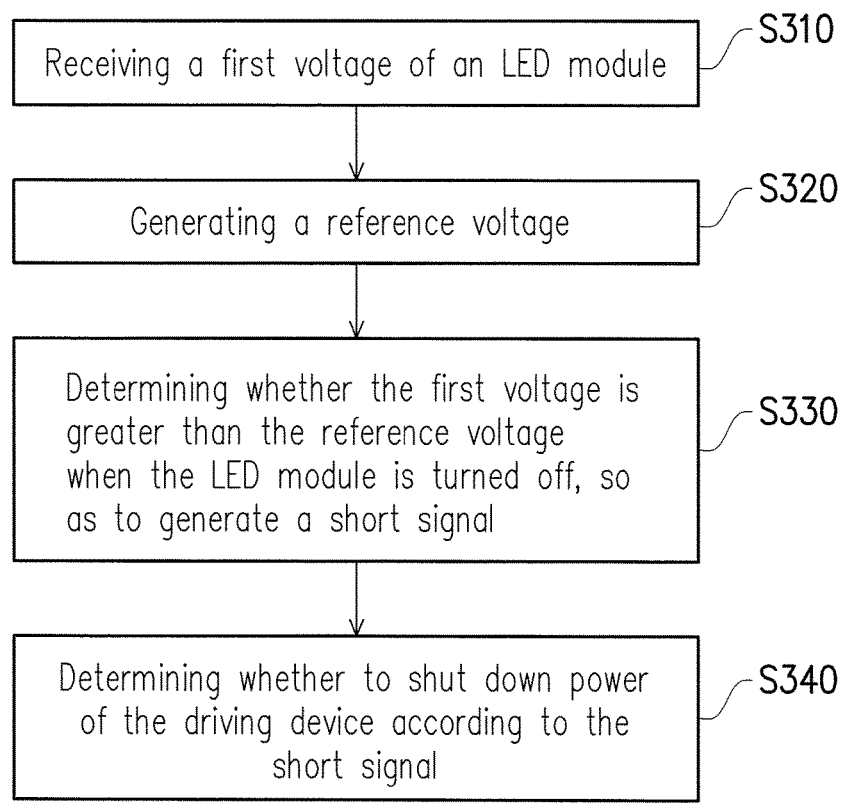
FIG. 3 is a flowchart of a short protection method of a driving device according to an embodiment of the invention.

FIG. 3 is a flowchart of a short protection method of a driving device according to an embodiment of the invention. The short protection method provided herein is adapted to the LED driving device 100 depicted in FIG. 1. With reference to FIG. 1 and FIG. 3, in step S310, the voltage comparison circuit 140 receives the first voltages V12-V42 of the LED modules 110-1-110-4. First nodes of the LED modules 110-1-110-4 receive the lighting voltage VL, and second nodes N12-N42 of the LED modules 110-1-110-4 have the first voltages V12-V42. In step S320, the reference voltage setting circuit 130 generates the reference voltage Vref. Here, the reference voltage Vref is relevant to the breakdown voltage of the Zener diode ZD1 and the lighting voltage VL. In step S330, the voltage comparison circuit 140 determines whether the first voltage is greater than the reference voltage Vref when the LED modules 110-1-110-4 turned off, so as to generate a short signal SC. If there is only one LED module, there would be only one first voltage. If there are plural LED modules, the maximum first voltage is selected from the first voltages and then compared with the reference voltage Vref. In step S340, the power supply 150 determines whether to shut down power of the LED driving device 100 according to the short signal SC. The detailed steps of the short protection method and the hardware applied in the method are explained in the previous embodiments.

To sum up, in the LED driving device and the short protection method of the driving device provided herein, the Zener diode is applied to generate the reference voltage, and the bias in the LED module and the reference voltage are applied to determine whether any of the LEDs in the LED module encounter the short issue, so as to shut down the power to the driving device. As such, the LED driving device provided herein can effectively prevent the driving device from being damaged by the LED encountering the short issue.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:
1. A light-emitting diode driving device comprising:
   a light-emitting diode module, a first node of the light-emitting diode module receiving a lighting voltage, a second node of the light-emitting diode module having a first voltage;
   a driving circuit configured to drive the light-emitting diode module;
   a reference voltage setting circuit receiving the lighting voltage to generate a reference voltage;

a voltage comparison circuit determining whether the first voltage is greater than the reference voltage when the light-emitting diode module is turned off and generating a short signal when the first voltage is greater than the reference voltage; and a power supply configured to supply power to the light-emitting diode module and determine whether to shut down the power of the light-emitting diode driving device according to the short signal, wherein the voltage comparison circuit comprises:

a photo coupler, wherein a first input terminal of the photo coupler receives the first voltage, a second input terminal of the photo coupler is coupled to the reference voltage setting circuit to receive the reference voltage, a third terminal of the photo coupler is coupled to a ground terminal, and a fourth terminal of the photo coupler generates a comparison signal;

a reset IC configured to adjust a voltage level of the comparison signal; and a power control switch, a control terminal of the power control switch receiving the comparison signal, the power control switch enabling the short signal when the first voltage is greater than the reference voltage, wherein the power supply shuts down the power of the light-emitting diode driving device when the short signal is being enabled.

2. The light-emitting diode driving device according to claim 1, wherein the light-emitting diode module comprises a plurality of serially connected light-emitting diodes, an anode terminal of a first light-emitting diode of the light-emitting diodes of the light-emitting diode module receives the lighting voltage, and a cathode terminal of a last light-emitting diode of the light-emitting diodes is the second node of the light-emitting diode module.

3. The light-emitting diode driving device according to claim 1, wherein the reference voltage setting circuit comprises:

a Zener diode having a breakdown voltage, a cathode terminal of the Zener diode receiving the lighting voltage; and a first resistor coupled between an anode terminal of the Zener diode and a ground terminal, wherein the reference voltage is obtained by subtracting the breakdown voltage from the lighting voltage, and the lighting voltage is greater than the breakdown voltage.

4. The light-emitting diode driving device according to claim 1, wherein the power control switch comprises a transistor, a gate terminal of the transistor is the control terminal of the power control switch, a first terminal of the transistor generates the short signal, and a second terminal of the transistor is coupled to the ground terminal.

5. The light-emitting diode driving device according to claim 1, wherein the voltage comparison circuit further comprises:

a propagation circuit comprising a first diode, an anode terminal of the first diode being coupled to the first node of the light-emitting diode module to receive the first voltage, a cathode terminal of the first diode being coupled to the first input terminal of the photo coupler.

6. The light-emitting diode driving device according to claim 1, wherein the driving circuit comprises:

a light-emitting diode driver generating a driving signal; and a current balancing switch coupled to the light-emitting diode module, a control terminal of the current balancing switch receiving the driving signal, wherein the light-emitting diode driver drives the light-emitting diode module according to the driving signal by using the current balancing switch.

7. A short protection method of a driving apparatus, comprising:

receiving a first voltage of a light-emitting diode module, a first node of the light-emitting diode module receiving a lighting voltage, a second node of the light-emitting diode module having a first voltage;

generating a reference voltage, wherein the reference voltage is relevant to a breakdown voltage of a Zener diode and the lighting voltage;

determining whether the first voltage is greater than the reference voltage when the light-emitting diode module is turned off, so as to generate a short signal; and Whether to shut down power of the LED driving device is determined according to the short signal, wherein the step of determining whether the first voltage is greater than the reference voltage comprises:

receiving the first voltage by a first input terminal of a photo coupler and receiving the reference voltage by a second input terminal of the photo coupler, wherein a third terminal of the photo coupler is coupled to a ground terminal, a fourth terminal of the photo coupler generates a comparison signal, and the power of the light-emitting diode module is shut down when the comparison signal is being enabled.

8. The short protection method according to claim 7, wherein the reference voltage is obtained by subtracting the breakdown voltage from the lighting voltage, and the lighting voltage is greater than the breakdown voltage.

* * * * *